United States Patent
Doi

[11] Patent Number: 5,898,739
[45] Date of Patent: Apr. 27, 1999

[54] QPSK DEMODULATOR FOR OBTAINING PHASE BY ARITHMETIC OPERATION

[75] Inventor: Masayuki Doi, Tokyo, Japan

[73] Assignee: Mitsubishi Denki Kabushiki Kaisha, Tokyo, Japan

[21] Appl. No.: 08/679,146

[22] Filed: Jul. 12, 1996

[30] Foreign Application Priority Data

Aug. 16, 1995 [JP] Japan .................................. 7-208579

[51] Int. Cl.$^6$ .............................. H03D 1/00; H03D 3/00; H04L 27/14
[52] U.S. Cl. .......................... 375/341; 375/329; 375/340; 375/324; 329/345; 329/315; 370/203; 370/204
[58] Field of Search .................................. 375/341, 329, 375/340, 332, 324; 329/304, 312, 315, 318, 325, 345, 349, 354, 360; 370/203, 204, 206

[56] References Cited

U.S. PATENT DOCUMENTS

| | | | |
|---|---|---|---|
| 4,796,188 | 1/1989 | Gale et al. .............................. | 364/443 |
| 5,504,453 | 4/1996 | MacDonald et al. .................... | 329/304 |
| 5,627,861 | 5/1997 | Kataoka et al. ......................... | 375/324 |
| 5,640,417 | 6/1997 | Barabash et al. ....................... | 375/222 |

FOREIGN PATENT DOCUMENTS 4111019    4/1992   Japan .

Primary Examiner—Chi H. Pham
Assistant Examiner—Khai Tran
Attorney, Agent, or Firm—Rothwell, Figg, Ernst & Kurz

[57] ABSTRACT

A QPSK demodulator that is smaller in size and lower in cost by restricting a storage capacity needed for a $TAN^{-1}$ ROM to a minimum. Values of I and Q channel base band signals obtained by converting and quantizing a received signal are approximated to a nearest one of values on $(2^{N-3}+1)$ segment lines represented by $Q=(n/2^{N-3})I$, where $n=0, 1, \ldots, 2^{N-3}$, with a phase accuracy of positive N bits. Data corresponding to the approximated segment line is previously stored in a $TAN^{-1}$ ROM as phase arithmetic data. An address decoder converts each base band signal into an address. An arithmetic circuit obtains phase data, for obtaining a QPSK demodulated signal, by performing a predetermined arithmetic operation, which is commensurate with the size of I and Q channel base band signals, on phase arithmetic data stored in the $TAN^{-1}$ ROM in association with the converted address.

8 Claims, 4 Drawing Sheets

| ADDRESS | PHASE ARITHMETIC DATA |
|---|---|
| 0 | → 0 |
| 1 | → 1 |
| 2 | → 3 |
| 3 | → 4 |
| 4 | → 5 |
| 5 | → 6 |
| 6 | → 8 |
| 7 | → 9 |
| 8 | → 10 |
| ⋮ | ⋮ |
| 30 | → 31 |
| 31 | → 31 |
| 32 | → 32 |

QPSK DEMODULATOR FOR OBTAINING PHASE BY ARITHMETIC OPERATION

BACKGROUND OF THE INVENTION

1. Field of the Invention

This invention relates to a QPSK (Quadrature Phase Shift Keying) demodulators and more particularly to a QPSK demodulator for obtaining a phase by an arithmetic operation based on a received signal.

2. Description of the Related Art

In conventional communication systems such as mobile communication, satellite communication and mobile-satellite communication, it has been common practice to use a demodulator utilizing a QPSK demodulating method. This QPSK demodulating method is exemplified by a method comprising the steps of orthogonal-converting a received signal into an in-phase component (I channel) and a quadrature component (Q channel), then converting the converted quadrature component signal into phase data and finally performing demodulation by a maximum likelihood estimation methods FIG. 5 of the accompanying drawings is a block diagram of a conventional QPSK demodulator utilizing the above-mentioned QPSK demodulating method. This conventional QPSK demodulator comprises a quadrature converter 4 for orthogonal-converting a signal, which is received from an input terminal 2, into an in-phase component (I channel) and a quadrature component (Q channel), an analog-to-digital converter 6 for sampling and quantizing the converted quadrature component signal, an address decoder 8 for converting combinations of I and Q channels into addresses, a $TAN^{-1}$ ROM 10 in which $TAN^{-1}(Q/I)$ values are previously stored in association with every combination of I and Q channel base band signals, and a maximum likelihood estimation circuit 12 for QPSK demodulating the phase of the converted-in-phase signal by a maximum likelihood estimation method to output a signal from an output terminal 14.

In operation, a received signal from the input terminal 2 is converted into an address for the $TAN^{-1}$ ROM 10 by the address decoder 8 after being converted into I and Q channel base band signals as it goes through the quadrature converter 4 and the analog-to-digital converter 6. The $TAN^{-1}$ ROM 10 previously stores a $TAN^{-1}(Q/I)$ value in association with every combination of I and Q channel base band signals I, Q. The conventional QPSK demodulator therefore converts the phase of data corresponding to the converted address by fetching phase data from the $TAN^{-1}$ ROM 10 The maximum likelihood estimation circuit 12 is for performing QPSK demodulation by maximum likelihood estimation based on the input phase data The thus QPSK demodulated signals are outputted from the output terminal 14.

However, in order to perform phase conversion according to the conventional art, it is necessary to store in the $TAN^{-1}$ ROM a $TAN^{-1}(Q/I)$ value in association with every combination of values of I and Q channel base band signals, which means that it would be difficult to make the demodulator smaller in size and lower in cost. Assuming that the I and Q channel base band signals have a plus/minus 8 bit accuracy (−128 to 127), phase has a positive 8 bit accuracy (0 to 255), and each $TAN^{-1}(Q/I)$ value is represented by 1 bytes it requires a $TAN^{-1}$ ROM having a storage capacity of at minimum $65536(=2^8 \times 2^8)$ bytes for all of $2^8$ possible values of I and Q base band signals.

SUMMARY OF THE INVENTION

It is therefore an object of this invention to provide a QPSK demodulator which can be made smaller in size and lower in cost by restricting the storage capacity needed for a $TAN^{-1}$ ROM to a minimum.

To accomplish the above objects according to a first aspect of the invention, there is provided a QPSK demodulator for obtaining phase data based on phase arithmetic data, comprising: means for orthogonal-converting a received signal into an in-phase component (hereinafter called "I channel") and a quadrature component (hereinafter called "Q channel") in quadrature and then converting phases of the I and Q channels into phase data; and means for demodulating the phase data; whereby values of base band signals of the I and Q channels are approximated to values on line segments in I-Q channel quadrature coordinates, and phase data is obtained based on phase arithmetic data corresponding to the approximated line segments.

According to a second aspect of the invention, in the first-named arrangement, if the phase is in a positive N bit accuracy, the values of the I and Q channel base band signals are approximated to nearest values on $(2^{N-3}+1)$ of the line segments represented by $Q=(n/2^{N-3})I$, $n=0, 1, 2, \ldots, 2^{N-3}$.

Specifically, the conventional demodulator requires position data corresponding to the value of every dot in the I-Q channel quadrature coordinates. Whereas in this invention, by approximating the value of a dot to the nearest one of values on $(2^{N-3}+1)$ segment lines represented by the above-mentioned equation and storing only position arithmetic data corresponding to the approximated segment lines, it is possible to considerably reduce data to be previously stored for obtaining the phase data.

Assuming that the phase is in a positive (N=) 8 bit accuracy, the conventional demodulator requires all data to be previously stored in association with 65536 dots, while the demodulator of this invention requires only data to be previously stored for 33 ($2^{8-3}+1$) segment lines.

According to a third aspect of the invention, there is a QPSK demodulator for orthogonal-converting a received signal into an in-phase component (hereinafter called "I channel") and a quadrature component (hereinafter called "Q channel"), then converting phases of the I and Q channels into phase data and performing demodulation based on the phase data, the QPSK demodulator comprising address converting means for converting addresses of base band signals of the I and Q channels into new addresses; storage means for storing phase arithmetic data corresponding to the respective new addresses; and an arithmetic circuit for obtaining the phase data by performing predetermined arithmetic, which is commensurate with the size of each of the I and Q channel base band signals, on the phase arithmetic data specified by the new addresses.

According to a fourth aspect of the inventions in the third-named arrangement, the arithmetic circuit obtains the phase data (hereafter also represented by P) by using any selected from the following arithmetic equations:

$P$=phase arithmetic data; $I \geq 0$, $Q \geq 0$, $|I| \geq |Q|$ $P=\pi/2$−phase arithmetic data; $I>0$, $Q \geq 0$, $|I|<|Q|$ $P=\pi/2$+phase arithmetic data; $I \leq 0$, $Q>0$, $|I|<|Q|$ $P=\pi$−phase arithmetic data; $I \leq 0$, $Q>0$, $|I| \geq |Q|$ $P=\pi$+phase arithmetic data; $I<0$, $Q \leq 0$, $|I| \geq |Q|$ $P=3\pi/2$−phase arithmetic data; $I<0$, $Q \leq 0$, $|I|<|Q|$ $P=3\pi/2$+phase arithmetic data; $I \geq 0$, $Q<0$, $|I|<|Q|$ $P=2\pi$−phase arithmetic data; $I \geq 0$, $Q<0$, $|I| \geq |Q|$ on the phase arithmetic data according to the sign of each of the I and Q channel base band signal values I, Q and the magnitude of an absolute value |I|, |Q| of the I and Q channel base band signals.

According to a fifth aspect of the invention, in the third-named arrangement, if the phase is in a positive N bit accuracy, the address converting means obtains an absolute value ratio by dividing a smaller one of absolute values of the I and Q channel base band signals by a larger one, multiplies the ratio by $2^{N-3}$, and rounds to an integer.

The demodulator of the third- through fifth-named inventions operates based on the principle that the base band signal values I, Q are approximated to values on segment lines in I-Q channel quadrature coordinates. Since the storage means can store only the phase arithmetic data corresponding to these segment lines, it is possible to reduce the storage capacity considerably.

DETAILED DESCRIPTION OF THE PREFERRED EMBODIMENT

A preferred embodiment of this invention will now be described with reference to the accompanying drawings.

Figure 1:
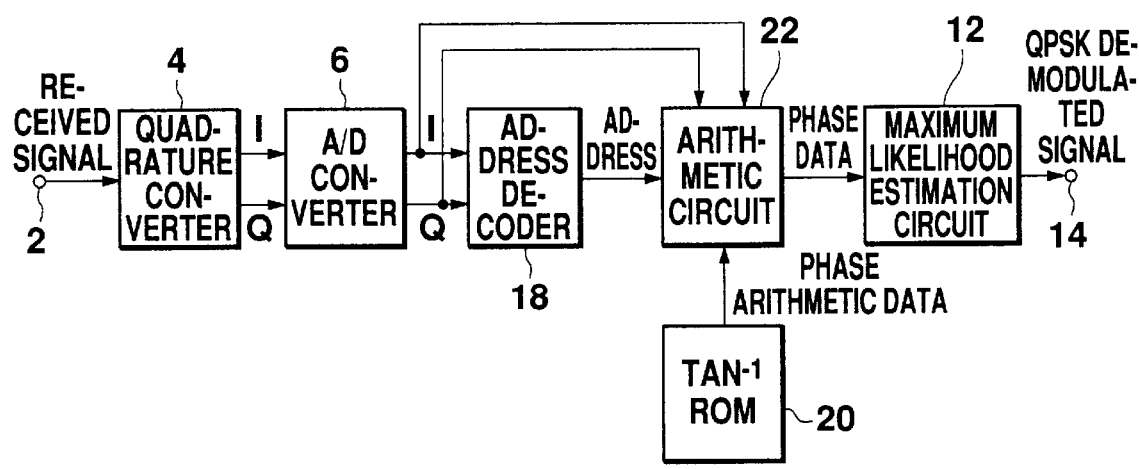
FIG. 1 is a block diagram of a QPSK demodulator according to one embodiment of this invention.
Figures 4, 5:
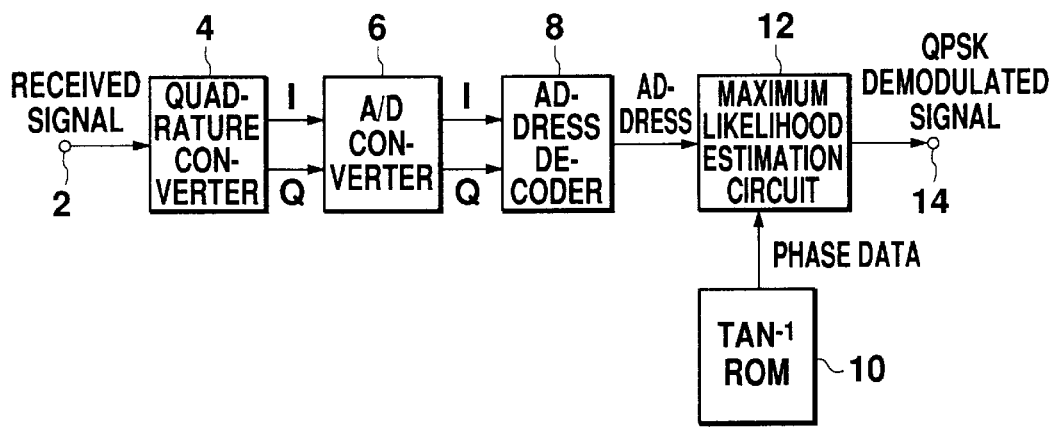
FIG. 4 is a diagram showing associating phase arithmetic data with addresses in a TAN$^{-1}$ ROM with a phase accuracy of plus 8 bits.
FIG. 5 is a block diagram of a conventional QPSK demodulator

FIG. 1 is a block diagram of a QPSK demodulator according to one embodiment of this invention Like reference numerals designate parts or elements similar to those of the conventional demodulator of FIG. 5. In the QPSK demodulator, a quadrature converter 4 for orthogonal-converting a signal, which is received from an input terminal 2, into an in-phase component (I channel) and a quadrature component (Q channel), an analog-to-digital converter 6 for sampling and quantizing the converted-in-quadrature signal, and a maximum likelihood estimation circuit 12 for QPSK demodulating phase data of the phase-converted signal to output a signal from an output signal 14; these parts or elements may be identical with those of the conventional demodulator. As a characteristic feature of this invention, the QPSK demodulator of this embodiment further comprises an address decoder 18 for converting addresses of I and Q channel base band signals, a TAN$^{-1}$ ROM 20 containing phase arithmetic data in association with the respective addresses converted by the address decoder 18, and an arithmetic circuit 22 for obtaining phase data by performing predetermined arithmetics which is commensurate with the size of I and Q channel base band signals, on the phase arithmetic data stored in the TAN$^{-1}$ ROM 20 in association with the address converted by the address decoder 18.

The principle of this embodiment will now be described, assuming that I and Q channel base band signals have a plus/minus 8 bit accuracy (−128 to 127), phase has a positive 8 bit accuracy (0 to 255), and each data value is represented by 1 byte.

Figure 2:
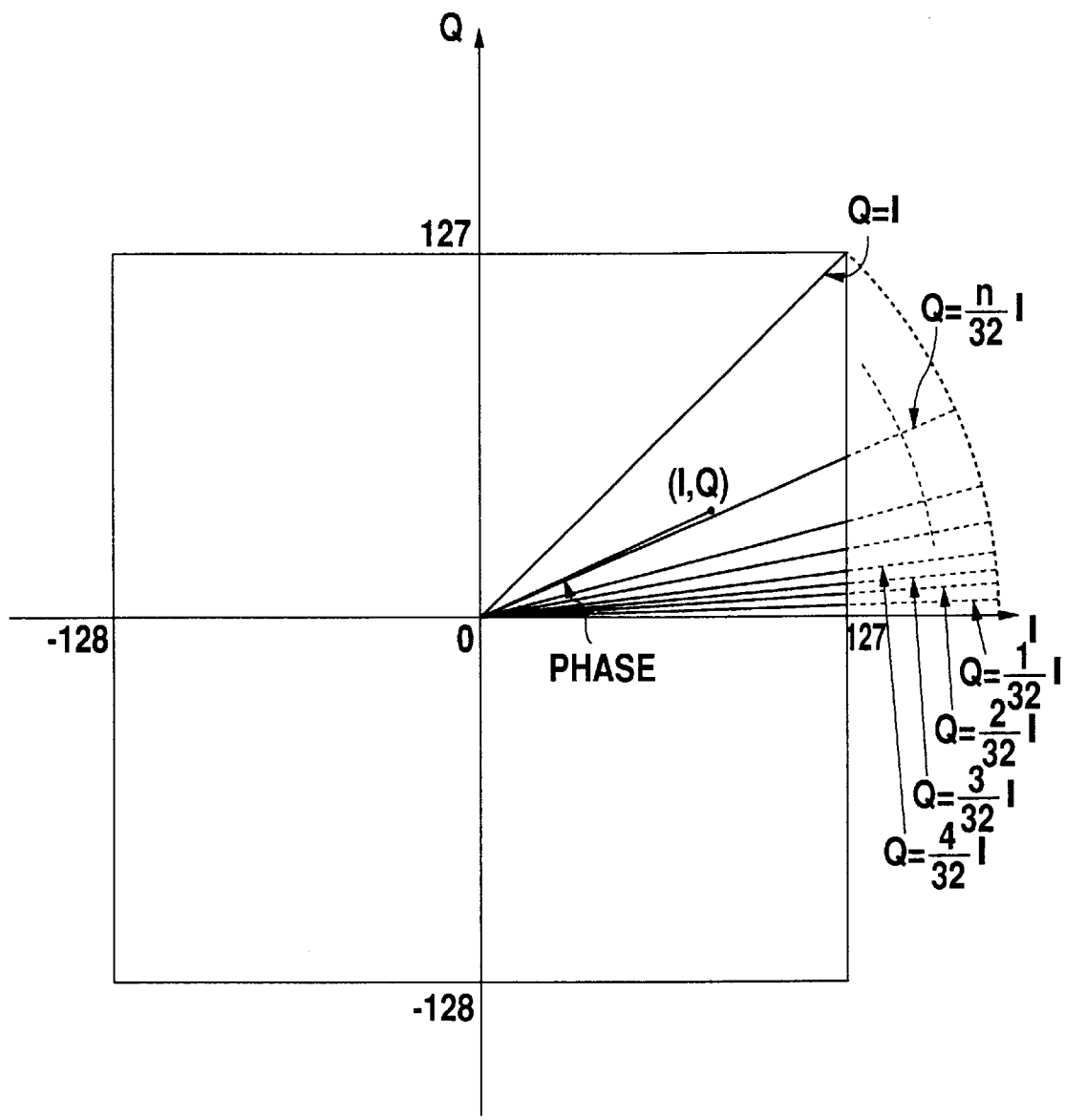
FIG. 2 is a diagram of I-Q quadrature coordinates representing I and Q channel base band signal values with a phase accuracy of plus 8 bits, illustrating the principle of this embodiment.

FIG. 2 is a diagram of I-Q quadrature coordinates representing I and Q channel base band signal values with a phase accuracy of positive 8 bits. Since each base band signal has a plus/minus 8 bit accuracy, its value may be −128<I<127 or −128<Q<127. In the conventional demodulator, since it requires phase data corresponding to all dots, i.e. 65536 (=$2^8 \times 2^8$), that formed the I and Q values for phase data of every combination, the TAN$^{-1}$ ROM must have a storage capacity of at least 65536 bytes.

This embodiment is characterized by the fact that a value of I and Q channel base band signals is approximated to the nearest value on predetermined segment lines on the I-Q channel quadrature coordinates, wherein a segment line represents a value of Q as a function of a value of I. Namely, the ROM stores only data associated with segment lines, rather than associating phase data with respective dots. Each segment line is created within a range of 0 to 45° about the original point. With a phase accuracy of plus N bits, ($2^{N-3}$+1) segment lines, which are represented by Q=(n/$2^{N-3}$)I where n=0, 1, 2, ..., $2^{N-3}$ are described with the original point as a start point. In the case of a positive 8 bit accuracy of FIG. 4, Q=nI/32 number of segment lines (n=0, 1, 2, ..., 32), i.e. 33, are described. Accordingly the value (I, Q) of each base band signal on I-Q coordinates is approximated to the nearest value on any of the segment lines.

However, values of base band signals scattered in all directions about the original point have to be represented by values on the segment lines contained within a range of 0 to 45° ($2^{-3}$ of 360°) as mentioned above. This procedure is performed in address decoder 18 which obtains an absolute value ratio by dividing a smaller one of the I and Q channel base band signal values |I|, |Q| by a larger one, multiplies the ratio by $2^{N-3}$ and rounds to an integer. The value of this integer is an address.

Thus, since each of the dot values on the I-Q coordinates are approximated to a value of any of 33 segment lines, it is necessary to previously store in the TAN$^{-1}$ ROM 20 only data associated with the individual segment lines. The data associated with the segment lines contained within the range of 0 to 45° is phase arithmetic data.

In this embodiment, firstly the phase arithmetic data associated with the addresses obtained by the address decoder 18 is obtained, and then, based on the phase arithmetic data, phase data to be represented in a range of 360° are obtained from real base band signal values I, Q. The arithmetic circuit 22 obtains phase data (P) according to the sign of each of the I and Q channel base band signal values I, Q and the magnitude of an absolute value |I|, |Q| of the I and Q channel base band signals, using any of eight arithmetic equations described below. Each equation is associated with each of divided regions different in phase one from another by 45°, with the original point of I-Q coordinates as a start point.

With a positive 8 bit accuracy, the conventional demodulator requires a TAN$^{-1}$ ROM storage capacity of 65536 bytes, while the demodulator of this embodiment requires only 33 bytes, which is about 1/2000 compared to the conventional one.

Assuming that the phase is in a positive 9 bit accuracy, since 65 ($2^{9-3}$+1) segment lines are needed, the necessary storage capacity of the TAN$^{-1}$ ROM 20 is 65 bytes, which is about 1/4000 compared with 262144 (=$2^9 \times 2^9$) bytes needed for the storage capacity of the conventional demodulator Also, with an alternative phase accuracy, it is possible to reduce the storage capacity of the TAN$^{-1}$ ROM 20 considerably. Namely, since it is possible to make the TAN$^{-1}$ ROM 20 small in size, downsizing of the entire demodulator can be realized.

Figure 3:
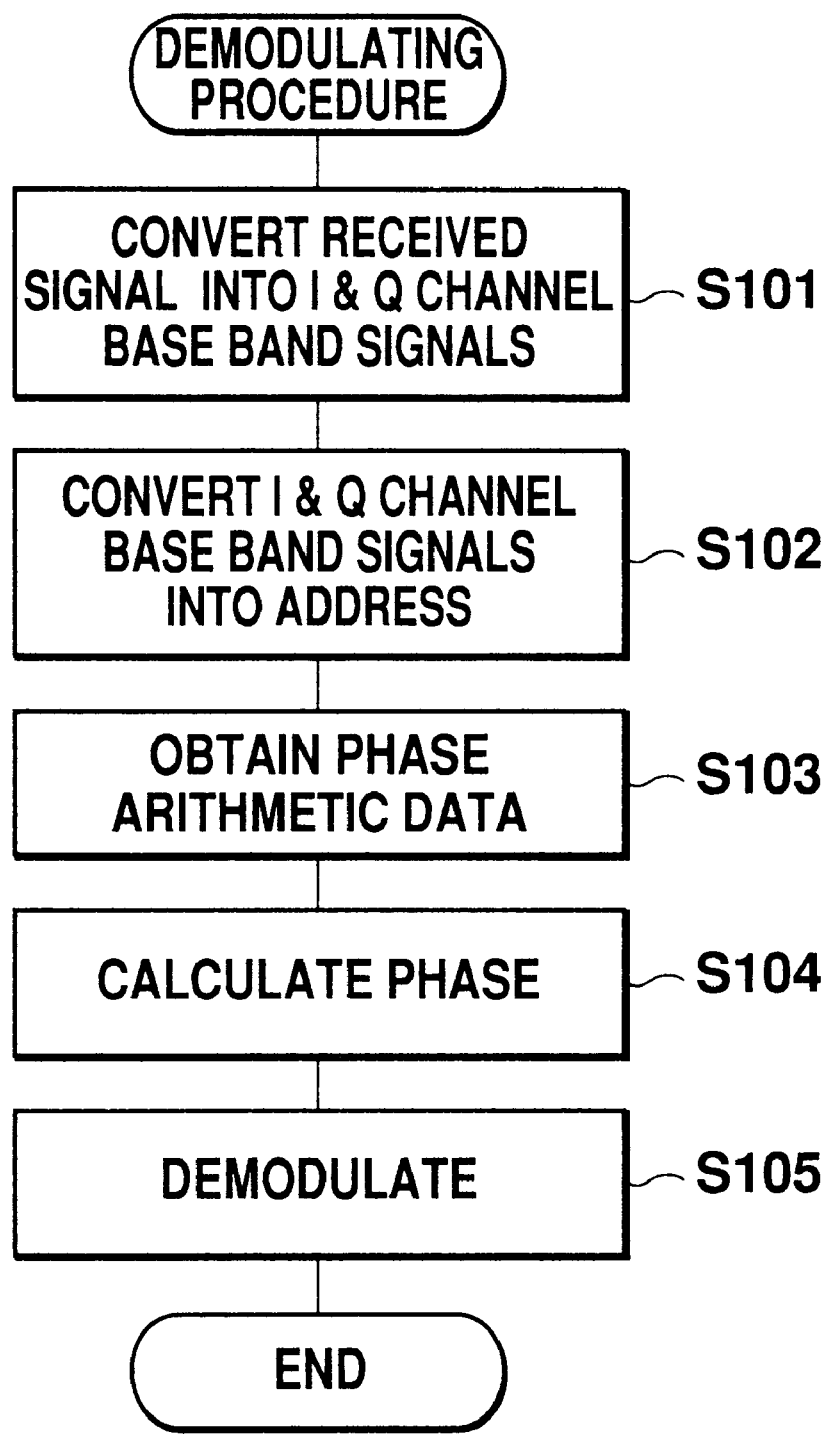
FIG. 3 is a flowchart of a demodulating procedure of the demodulator of the embodiment.

The operation of the demodulator according to this embodiment will now be described using the flowchart of FIG. 3.

A received signal fetched to the input terminal 2 is converted into I and Q channel base band signals as it passes through the quadrature converter 4 and the analog-to-digital converter 6 (step 101). The address decoder 18 converts the address of I and Q channel base band signals (step 102) in the following manner. An absolute value ratio is obtained by dividing a smaller one of the I and Q channel base band signal values |I|, |Q| by a larger one. With a phase accuracy of positive N bits, the ratio is multiplied by $2^{N-3}$ and rounded to an integer. The address decoder 18 converts the address of the I and Q channel base band signals. If both the base band signal values I, Q are 0, the address is converted to 0.

Then, the arithmetic circuit 22 obtains phase arithmetic data based on the address from the address decoder 18 (step 103). FIG. 4 is a list of phase arithmetic data associated with addresses of the $TAN^{-1}$ ROM 20 with a phase accuracy of positive (N=) 8 bits. The address decoder 18 convert the base band signals into values of 0 through 32 with the phase in a positive 8 bit accuracy. Since the phase arithmetic data corresponding to the respective addresses are previously set in the $TAN^{-1}$ ROM 20, the arithmetic circuit 22 fetches from the $TAN^{-1}$ ROM 20, the phase arithmetic data associated with the addresses received from the address decoder 18.

The arithmetic circuit 22 calculates a phase by performing a predetermined arithmetic operation, which is commensurate with the size of I and Q channel base band signals, on the phase arithmetic data obtained in the foregoing procedure (step 104). In this specification, the term magnitude, means the sign of each of I and Q channel base band signals as well as the magnitude of an absolute value of each base band signal The arithmetic circuit 22 can obtain the phase using an equation selected from the following predetermined arithmetic equations based on this magnitudes.

$P$=phase arithmetic data; $I \geq 0$, $Q \geq 0$, $|I| \geq |Q|$ $P = \pi/2$–phase arithmetic data; $I>0$, $Q \geq 0$, $|I|<|Q|$ $P = \pi/2$+phase arithmetic data; $I \leq 0$, $Q>0$, $|I|<|Q|$ $P = \pi$–phase arithmetic data; $I \leq 0$, $Q>0$, $|I| \geq |Q|$ $P = \pi$+phase arithmetic data; $I<0$, $Q \leq 0$, $|I| \geq |Q|$ $P = 3\pi/2$–phase arithmetic data; $I<0$, $Q \leq 0$, $|I|<|Q|$ $P = 3\pi/2$+phase arithmetic data; $I \geq 0$, $Q<0$, $|I|<|Q|$ $P = 2\pi$–phase arithmetic data; $I \geq 0$, $Q<0$, $|I| \geq |Q|$ The maximum likelihood estimation circuit 12 performs QPSK demodulation by a maximum likelihood estimating method based on the phase data obtained by the arithmetic circuit 22 (step 105). The thus obtained QPSK demodulated signal is outputted from the output terminal 14.

As mentioned in the foregoing descriptions in this embodiment, the value of the I and Q channel base band signals is approximated to a value on a predetermined segment line on the I-Q channel quadrature coordinates, and phase data is calculated based on the phase arithmetic data associated with the individual segment data. Accordingly, since ($2^{N-3}+1$) bytes corresponding to the number of segment lines suffice for the storage capacity of the $TAN^{-1}$ ROM 20, it is possible to reduce the storage capacity considerably so that the demodulator can be downsized with minimum cost.

What is claimed is:

1. A QPSK demodulator comprising:

means for orthogonally converting a received signal into an in-phase component I and a quadrature component Q;

means for storing phase arithmetic data corresponding to phase data for a predefined subset of values of I and Q, said phase arithmetic data being associated with line segments in an I-Q quadrature coordinate system;

means for converting baseband values of received I and Q components into address data corresponding to one of said line segments;

means for retrieving phase arithmetic data based on said address data;

means for calculating phase data based on said retrieved phase arithmetic data and said received I and Q values; and means for demodulating said calculated phase data.

2. A QPSK demodulator according to claim 1, wherein if phase has a positive N bit accuracy, said values of said I and Q components are approximated to nearest values on ($2^{N-3}+1$) of said line segments represented by $Q=(n/2^{N-3})I$, $n=0, 1, 2, \ldots, 2^{N-3}$.

3. A QPSK demodulator comprising:

means for orthogonally converting a received signal into an in-phase component I and a quadrature component Q;

means for storing phase arithmetic data corresponding to phase data for a predefined subset of values of I and Q;

means for converting baseband values of received I and Q components into an address corresponding to one of said stored phase arithmetic data;

means for retrieving phase arithmetic data based on said address;

an arithmetic circuit that uses received baseband values of I and Q, together with retrieved phase arithmetic data from said data storage means, to generate phase data by performing a predetermined arithmetic operation commensurate with the size of each of said I and Q components; and means for demodulating said phase data.

4. A QPSK demodulator according to claim 3, wherein said arithmetic circuit obtains said phase data (hereafter also represented by P) by using any of the following arithmetic equations:

$P$=phase arithmetic data; $I \geq 0$, $Q \geq 0$, $|I| \geq |Q|$ $P = \pi/2$–phase arithmetic data; $I>0$, $Q \geq 0$, $|I|<|Q|$ $P = \pi/2$+phase arithmetic data; $I \leq 0$, $Q>0$, $|I|<|Q|$ $P = \pi$–phase arithmetic data; $I \leq 0$, $Q>0$, $|I| \geq |Q|$ $P = \pi$+phase arithmetic data; $I<0$, $Q \leq 0$, $|I| \geq |Q|$ $P = 3\pi/2$–phase arithmetic data; $I<0$, $Q \leq 0$, $|I|<|Q|$ $P = 3\pi/2$+phase arithmetic data; $I \geq 0$, $Q<0$, $|I|<|Q|$ $P = 2\pi$–phase arithmetic data; $I \geq 0$, $Q<0$, $|I| \geq |Q|$ on said phase arithmetic data according to the sign of each of said I and Q components and magnitude size of an absolute value |I|, |Q| of said I and Q components.

5. A QPSK demodulator according to claim 3, wherein if the phase has a positive N bit accuracy, said address converting means obtains an absolute value ratio by dividing a smaller one of absolute values of said I and Q components by a larger one, multiplies said ratio by $2^{N-3}$ and rounds to an integer.

6. A QPSK demodulator comprising:
   (a) quadrature converting means for converting signals received from an input terminal into an in-phase component I and a quadrature component Q;
   (b) analog-to-digital converting means for sampling and quantizing said converted quadrature components;
   (c) address converting means for converting addresses of said I and Q components into new addresses;
   (d) storage means for storing phase arithmetic data corresponding to the respective new addresses;
   (e) an arithmetic circuit for obtaining phase data by performing a predetermined arithmetic operation, which is commensurate with the size of each of said I and Q components, on said phase arithmetic data included in said storage means corresponding to the respective new addresses; and
   (f) a maximum likelihood estimation circuit for QPSK demodulating said phase data of said received signal, which is converted in phases by a maximum likelihood estimation method.

7. A QPSK demodulator according to claim 6, wherein said arithmetic circuit obtains said phase data (hereafter also represented by P) by using any of the following arithmetic equations:

$P$=phase arithmetic data; $I \geq 0$, $Q \geq 0$, $|I| \geq |Q|$ $P = \pi/2$−phase arithmetic data; $I > 0$, $Q \geq 0$, $|I| < |Q|$ $P = \pi/2$+phase arithmetic data; $I \leq 0$, $Q > 0$, $|I| < |Q|$ $P = \pi$−phase arithmetic data; $I \leq 0$, $Q > 0$, $|I| \geq |Q|$ $P = \pi$+phase arithmetic data; $I < 0$, $Q \leq 0$, $|I| \geq |Q|$ $P = 3\pi/2$−phase arithmetic data; $I < 0$, $Q \leq 0$, $|I| < |Q|$ $P = 3\pi/2$+phase arithmetic data; $I \geq 0$, $Q < 0$, $|I| < |Q|$ $P = 2\pi$−phase arithmetic data; $I \geq 0$, $Q < 0$, $|I| \geq |Q|$ on said phase arithmetic data according to the sign of each of said I and Q components and the magnitude of an absolute value $|I|$, $|Q|$ of said I and Q components.

8. A QPSK demodulator according to claim 6, wherein if phase has a positive N bit accuracy, said address converting means obtains an absolute value ratio by dividing a smaller one of absolute values of said I and Q components by a larger one, multiplies said ratio by $2^{N-3}$, and rounds to an integer.

* * * * *